United States Patent [19]

Kuo et al.

[11] Patent Number: 5,391,440
[45] Date of Patent: Feb. 21, 1995

[54] METHOD OF FORMING A LEAK PROOF PLASMA SPRAYED INTERCONNECTION LAYER ON AN ELECTRODE OF AN ELECTROCHEMICAL CELL

[75] Inventors: Lewis J. H. Kuo; Shailesh D. Vora, both of Monroeville, Pa.

[73] Assignee: Westinghouse Electric Corporation, Pittsburgh, Pa.

[21] Appl. No.: 195,335

[22] Filed: Feb. 14, 1994

[51] Int. Cl.$^6$ .................... H01M 8/12; B05D 5/12
[52] U.S. Cl. .................... 429/27; 429/31; 429/33; 29/623.5; 427/115; 427/446
[58] Field of Search .............. 429/27, 30–33; 29/623.5; 427/115, 419.2, 446, 453, 126.3

[56] References Cited

U.S. PATENT DOCUMENTS

| | | | |
|---|---|---|---|
| 3,330,697 | 7/1967 | Pechini | 117/215 |
| 3,823,302 | 7/1974 | Muehlberger | 219/121 P |
| 3,839,618 | 10/1974 | Muehlberger | 219/121 P |
| 4,049,841 | 9/1977 | Coker et al. | 427/34 |
| 4,395,468 | 7/1983 | Isenberg | 429/31 |
| 4,490,444 | 12/1984 | Isenberg | 429/31 |
| 4,582,766 | 4/1986 | Isenberg et al. | |
| 4,597,170 | 7/1986 | Isenberg | 29/623.5 |
| 4,629,537 | 12/1986 | Hsu | 204/15 |
| 4,631,238 | 12/1986 | Ruka | 429/30 |
| 4,696,731 | 9/1987 | Tenhover | 204/290 |
| 4,857,420 | 8/1989 | Maricle et al. | 429/30 |
| 4,861,345 | 8/1989 | Bowker et al. | 29/623.1 |
| 4,895,576 | 1/1990 | Pal et al. | 29/623.5 |
| 5,051,321 | 9/1991 | Kitagawa et al. | 429/30 |
| 5,064,734 | 11/1991 | Nazmy | 429/33 |
| 5,080,689 | 1/1992 | Pal et al. | 29/623.5 |
| 5,085,742 | 2/1992 | Dollard et al. | 205/188 |
| 5,106,654 | 4/1992 | Isenberg | 427/115 |
| 5,132,352 | 7/1992 | Richards et al. | 524/403 |
| 5,143,751 | 9/1992 | Richards et al. | 427/126.3 |

FOREIGN PATENT DOCUMENTS

497542A1  1/1992  European Pat. Off. .

OTHER PUBLICATIONS

Eror, Nicols G. and Anderson, Harlen U., "Polymeric Precursor Synthesis of Ceramic Materials", Mat. Res. Soc. Symp. Proc., vol. 73 (1986) (month not available).

Primary Examiner—Anthony Skapars
Attorney, Agent, or Firm—Daniel P. Cillo

[57] ABSTRACT

A dense, substantially gas-tight, electrically conductive interconnection layer is formed on an electrode structure of an electrochemical cell by: (A) providing an electrode structure; (B) forming on a selected portion of the electrode surface, an interconnection layer having the general formula $La_{1-x}M_xCr_{1-y}N_yO_3$, where M is a dopant selected from the group of Ca, Sr, Ba, and mixtures thereof, and where N is a dopant selected from the group of Mg, Co, Ni, Al, and mixtures thereof, and where x and y are each independently about 0.075–0.25, by thermally spraying, preferably plasma arc spraying, a flux added interconnection spray powder, preferably agglomerated, the flux added powder comprising flux particles, preferably including dopant, preferably $(CaO)_{12}(Al_2O_3)_7$ flux particles including Ca and Al dopant, and $LaCrO_3$ interconnection particles, preferably undoped $LaCrO_3$, to form a dense and substantially gas-tight interconnection material bonded to the electrode structure by a single plasma spraying step; and, (C) heat treating the interconnection layer at from about 1200° to 1350° C. to further densify and heal the micro-cracks and macro-cracks of the thermally sprayed interconnection layer. The result is a substantially gas-tight, highly doped, electrically conductive interconnection material bonded to the electrode structure. The electrode structure can be an air electrode, and a solid electrolyte layer can be applied to the unselected portion of the air electrode, and further a fuel electrode can be applied to the solid electrolyte, to form an electrochemical cell for generation of electrical power.

20 Claims, 3 Drawing Sheets

METHOD OF FORMING A LEAK PROOF PLASMA SPRAYED INTERCONNECTION LAYER ON AN ELECTRODE OF AN ELECTROCHEMICAL CELL

GOVERNMENT CONTRACT

The Government of the United States of America has rights in this invention pursuant to Contract No. DE-FC21-91MC28055 awarded by the United States Department of Energy.

Background of the Invention

FIELD OF THE INVENTION

The invention relates to high temperature electrochemical cells, and to a method of forming a high temperature, dense, substantially gas-tight interconnection layer on an electrode of an electrochemical cell. More particularly, the invention provides a method of forming a leak proof, substantially gas-tight, plasma sprayed interconnection layer bonded to an electrode of a high temperature solid oxide electrolyte electrochemical cell, by plasma spraying a flux added interconnection powder onto an electrode.

High temperature solid oxide electrolyte electrochemical generator devices are disclosed, for example, in U.S. Pat. Nos. 4,395,468 (Isenberg) and 4,490,444 (Isenberg). Such electrochemical generator devices comprise a plurality of elongated, typically annular, electrochemical cells or fuel cells which convert chemical energy into direct-current electrical energy. The fuel cells can be interconnected in series to provide a desired voltage and/or in parallel to provide a desired current capacity.

Each fuel cell typically includes an optional porous support tube of calcia stabilized zirconia. A porous annular air electrode or cathode generally surrounds the outer periphery of the support tube. The air electrode can be made with doped oxides of the perovskite family, such as, for example, lanthanum manganite ($LaMnO_3$). A dense layer of gas-tight solid electrolyte, typically yttria stabilized zirconia ($ZrO_2$), substantially surrounds the outer periphery of the air electrode. A porous fuel electrode or the anode, typically of nickel-zirconia cermet or cobalt-zirconia cermet, substantially surrounds the outer periphery of the solid electrolyte. Both the solid electrolyte and the outer electrode, or, in this case the fuel electrode, are discontinuous to allow for inclusion of an electrically conductive interconnection material providing means to connect adjacent fuel cells. A selected radial segment of the air electrode, for example, is covered by the interconnection material. The interconnection material may comprise a doped lanthanum chromite ($LaCrO_3$) film. The generally used dopant is Mg, although other dopants such as Ca and Sr have been suggested. The dopant serves to enhance the conductivity of the lanthanum chromite p-type conductor.

Various methods have been used to apply the interconnection material to the air electrode. Conventionally, both the electrolyte and the interconnection material are applied to the surface of different selected portions of the air electrode by a modified electrochemical vapor deposition process, at temperatures up to 1450° C., with vaporized halides of zirconium and yttrium used for the electrolyte and vaporized halides of lanthanum, chromium, magnesium, calcium or strontium for the interconnection material, as taught in U.S. Pat. Nos. 4,597,170 (Isenberg) and 4,609,562 (Isenberg, et al.). The fuel electrode, typically nickel-zirconia cermet, is conventionally applied on top of the electrolyte, or grown on the electrolyte, by an electrochemical vapor deposition process, wherein nickel particles are anchored to the electrolyte surface by a vapor deposited skeleton of electrolyte material, as also taught in U.S. Pat. Nos. 4,582,766 (Isenberg, et al.) and 4,597,170 (Isenberg).

It has been found that there are certain thermodynamic and kinetic limitations in doping the interconnection material from a vapor phase by a vapor deposition process at temperatures between about 1300° to 1450° C. The vapor pressures of calcium chloride and strontium chloride, for example, are low at vapor deposition temperatures, and thus the transport of these dopants to the reaction zone at the surface of the air electrode is difficult. Therefore, magnesium has been used as the primary dopant for the interconnection material. However, magnesium doped lanthanum chromite has a substantial thermal expansion mismatch with the materials of the air electrode and electrolyte. For example, $La_{0.99}Mg_{0.01}CrO_3$ has a thermal expansion mismatch of 12–14%. Additionally, halide vapors at 1300° to 1400° C. in a reducing atmosphere at partial pressures of $O_2$ less that $1 \times 10^{-4}$ atm can interact with the air electrode during the initial period of interconnection application. This may cause the air electrode constituents, such as manganese, to leach into the interconnection material and increase resistivity, causing problems in the electrochemical generator output. Further, although electrochemical vapor deposition techniques initially form leak-tight interconnections, the long term stability of these interconnections remain questionable.

Adequately doping the interconnection material with Ca, Sr and other dopants identified in the Isenberg patents could reduce the thermal expansion mismatch problem with the air electrode and electrolyte material, but is constrained by kinetic and thermodynamic limitations of the electrochemical vapor deposition process.

U.S. Pat. No. 4,631,238 (Ruka) attempts to solve potential interconnection thermal expansion mismatch problems between the interconnection material, electrolyte, electrodes and support materials. Ruka teaches cobalt doped lanthanum chromite, preferably also doped with magnesium, for example $LaCrO_{0.93}Mg_{0.03}Co_{0.04}CrO_3$, as a vapor deposited interconnection material using chloride vapors of lanthanum, chromium, magnesium and cobalt. Ruka similarly suffers from some kinetic and thermodynamic limitations.

Other methods of making doped $LaCrO_3$ interconnection materials have been tried. U.S. Pat. No. 4,861,345 (Bowker, et al.), in a different approach, deposits particles of $LaCrO_3$, doped with Mg, Sr, Ca, Ba or Co and coated with calcium oxide (CaO) or chromium oxide ($Cr_2O_3$), on an air electrode. The doped $LaCrO_3$ particles are solid-state sintered at high temperatures of about 1300° C. to 1550° C. Here, the coatings on the particles aid in sintering by providing a liquid phase which diffuses into the doped $LaCrO_3$ structure. However, sintering the doped particles of interconnection material at high temperatures of about 1300° C. to 1550° C. to make a leak-tight interconnection film, and then bonding it to the air electrode can result in several problems. These problems include Mn leaching from the air electrode into the interconnection material and diffusion of interconnection material dopant into the air electrode.

U.S. Pat. No. 4,895,576 (Pal, et al.), in another approach, teaches forming a layer of metal oxide particles, e.g., Ca, Sr, Co, Ba and Mg, on the interconnection portion of an air electrode, heating the air electrode with the deposited layer to about 1300° C. to 1450° C., and vapor depositing a skeletal structure of lanthanum chromite interconnection material around and between the metal oxide particles at about 1300° C. to 1450° C. in the presence of metal halide vapors comprising lanthanum, chromium, and magnesium chlorides. The metal oxide deposit is incorporated into the lanthanum chromium oxide structure as it grows thicker with time on top of the air electrode. Pal then anneals the unit at about 1100° C. to 1400° C., whereby metal ions of the metal oxide particles diffuse into the bulk of the lanthanum chromite interconnection material. This process requires a long annealing step in addition to deposition steps, to maximize conductivity by distributing the dopant across the lanthanum chromium oxide film. Some of the dopant can diffuse into the air electrode at such high temperatures.

None of these proposed solutions solves all the problems of thermal expansion mismatch, Mn leaching from the air electrode, dopant leaching from the interconnection material, and problems associated with doping Ca, Sr, Co, Ba and other materials by vapor deposition. Thus, none is optimally effective for providing a uniformly thick, durable, leak-tight, well-bonded, electrically conductive interconnection on a variety of substrates in a simple and economical fashion. Many of the problems, including the leak-tightness and stability of the interconnection material, are inherent in the process used to form the interconnection material. There is a need for a method of forming an interconnection layer on an electrode of an electrochemical cell, which provides a highly doped, substantially gas-tight, electrically conductive interconnection material without the associated problems.

Plasma arc spraying and flame spraying, i.e., thermal spraying or plasma spraying, are known film deposition techniques. Plasma spraying involves spraying a molten powdered metal or metal oxide onto the surface of a substrate using a thermal or plasma spray gun. U.S. Pat. No. 4,049,841 (Coker, et al.) generally teaches plasma and flame spraying techniques. U.S. Pat. Nos. 3,823,302 (Muehlberger) and 3,839,618 (Muehlberger) generally teach plasma spray guns.

Plasma spraying is a technique and has been used for the fabrication of components, other than the interconnection material, of high temperature, solid oxide electrolyte electrochemical cells. Plasma spraying, however, has not been effectively used for the fabrication of the interconnection material. Attempts to plasma spray an interconnection material on an electrode structure of an electrochemical cell have been found to remain porous after cell processing, and further to lead toward intermixing of the fuel and oxidant during cell operation. Gas can pass through the structure, whereas prior vapor deposition and sintering techniques provided a closed pore structure. Such intermixing of fuel and oxidant resulting from leakage through the interconnection microstructure is detrimental to the electrical power generation, and also to stability of the cells. Accordingly, the efficiency and life expectancy of the electrochemical cells are substantially reduced. It is desirable for long term electrochemical fuel cell operation and component stability to provide a substantially leak-tight and stable interconnection.

None of these references teach or suggest effectively plasma spraying an interconnection material on an electrode, and providing a plasma sprayed interconnection that is substantially leak-tight, highly conductive and stable. There is a need to provide a dense, substantially gas-tight, stable, highly doped, electrically conductive interconnection material in an electrochemical cell. There is a further need to provide an interconnection material in an electrochemical cell that is substantially densified, i.e., substantially non-porous and gas-tight, upon a single plasma spraying step, wherein both densification and deposition of the interconnection is accomplished.

The invention is directed to a solution to the above-identified problems identified by providing a method of substantially densifying or closing the pores of an interconnection material coincident with plasma spraying the interconnection material on an electrode of an electrochemical cell, which forms an effective gaseous diffusion barrier, which upon subsequent heat treating to heal cracks resulting from plasma spraying, forms a substantially leak proof, stable, highly doped, electrically conductive interconnection.

SUMMARY OF THE INVENTION

It is an object of the invention to provide a dense, substantially gas-tight, and also a highly doped, stable, electrically conductive interconnection material used in an electrochemical cell.

It is another object of the invention to provide a plasma or thermally sprayed interconnection material onto an electrode structure of an electrochemical cell which is substantially densified and gas-tight (i.e., substantially nonporous), well-bonded, highly doped, and electrically conductive.

It is another object of the invention to provide a method of densifying an interconnection material upon, or in other words, coincident with plasma spraying, e.g. plasma arc spraying, interconnection layers on an electrode of an electrochemical cell, to form a substantially leak proof interconnection.

It is yet another object of the invention to provide a plasma sprayed interconnection material onto an electrode structure of an electrochemical cell that forms dense and substantially gas-tight layers upon a single plasma arc spraying step.

It is a feature of the invention to plasma spray a flux (i.e., a liquid phase former) added interconnection powder which upon plasma spraying substantially densities the bulk interconnection material.

It is an advantage of the invention to plasma spray an interconnection material onto an electrode structure of an electrochemical cell which is substantially gas-tight upon a single plasma spraying step by using a flux added interconnection powder as the plasma spray feed powder.

It is another advantage of the invention to densify an interconnection material coextensively with a plasma spraying technique by using a flux in the plasma spray feed powder.

According to one aspect of the invention, these and other objects, features, and advantages are achieved in a method of forming a dense, substantially gas-tight, electrically conductive interconnection layer on an electrode structure, characterized by the steps of: (A) providing an electrode structure; (B) providing a flux added feed powder, preferably an agglomerated powder, comprising a mixture of interconnection particles, preferably undoped lanthanum chromite interconnection particles, flux particles, preferably calcium aluminate flux particles, and dopant, the dopant being preferably contained within the flux particles, and preferably selected from the group of dopants consisting of Ca, Sr, Ba, Mg, Co, Ni, and Al; (C) forming by thermal spraying, preferably by plasma arc spraying, the flux added feed powder, on a selected portion of the electrode structure, a dense electrically conductive interconnection material bonded to the electrode surface; and, (D) heating the interconnection material in air at from a temperature of about 1200° to 1350° C., to provide a dense, substantially gas-tight, electrically conductive interconnection material bonded to the electrode surface.

According to another aspect, the invention provides a high temperature, solid oxide electrochemical cell, characterized by: a first electrode; a solid oxide electrolyte disposed on a portion of the first electrode; a second electrode disposed on a portion of the solid electrolyte; an electrically conductive, substantially gas-tight interconnection material disposed on another portion of the first electrode for electrical coupling to an adjacent cell, further characterized by the interconnection comprising a thermally sprayed, preferably a plasma arc sprayed, flux added feed powder comprising a mixture of undoped $LaCrO_3$ interconnection particles and calcium aluminate flux particles including Ca and Al dopant, heat treated at a temperature of about 1200° to 1350° C.

Additional embodiments and aspects of the invention will be apparent from the following discussion of particular examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
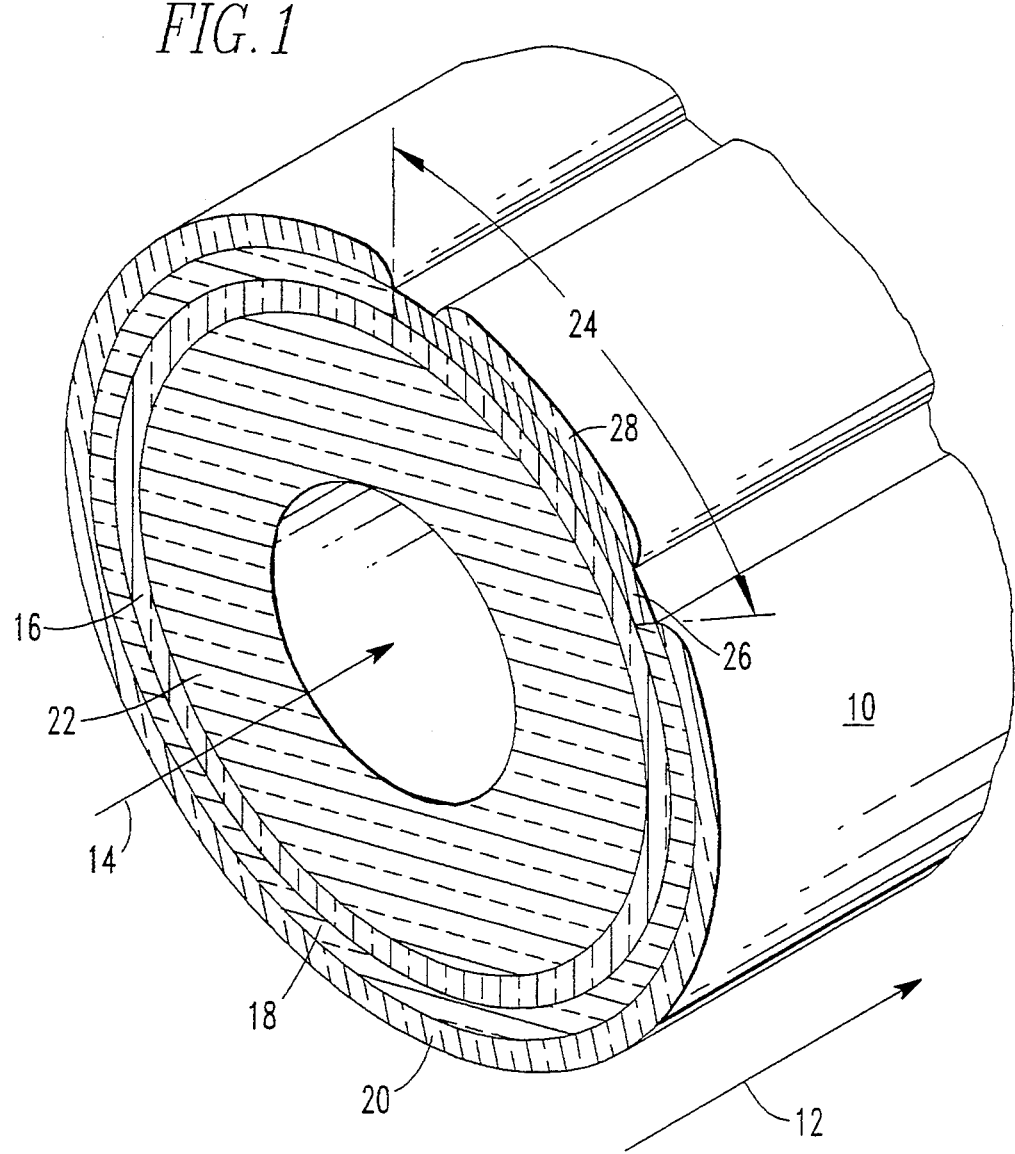
FIG. 1 is a schematic sectional view of a preferred embodiment showing a single, tubular, electrochemical cell, the interconnection layer formed by the method of this invention being shown on the top of a supporting electrode.

Referring to FIG. 1, a preferred, tubular, electrochemical cell 10 is shown. The preferred configuration is based upon a fuel cell system wherein a flowing gaseous fuel, such as hydrogen, carbon monoxide or unreformed hydrocarbon gases, is directed over the outside of the cell, axially in the embodiment of FIG. 1 in the direction shown by arrow 12. An oxidant, such as air or $O_2$, is directed through the inside of the cell, as shown by arrow 14. Oxygen molecules pass through porous electrically conductive air electrode structure 16 and are convened to oxygen ions which pass through an electrolyte 18, to combine with the fuel at a fuel electrode 20.

The foregoing description of the preferred tubular configuration is merely an example and should not be considered limiting in any manner. It is possible that other configurations for the electrochemical cell 10 could be used, for example, planar shaped cells. In addition, the interconnection material of the invention, as described below, can be applied to a variety of substrates and to electrochemical cells other than fuel cells. The invention is applicable to such variations with reversed cell electrodes and the like, or so-called "inverted" cell, and similar such variations. In this case, the location of the fuel and oxidant are rearranged, for example, such that air or $O_2$ flows over the outside of the cell and the fuel flows through the inside of the cell. As applied to fuel cells, for example, the term "air electrode" as used herein refers to the electrode which will be in contact with an oxidant, and "fuel electrode" refers to the electrode that will be in contact with the fuel.

The electrochemical cell 10 can include an optional, porous support tube 22. This support tube can comprise calcia stabilized zirconia forming a porous wall approximately one to two millimeters thick. The air electrode or cathode 16 is a porous, composite metal oxide structure approximately 50 microns to 1500 microns (0.05 millimeter to 1.5 millimeters) thick. The air electrode can be deposited on the support tube by well known slurry dip and sintering techniques, extruded as a self-supporting structure, etc. The air electrode comprises, for example, doped oxides or mixtures of oxides of the perovskite family, such as, $LaMnO_3$, $CaMnO_3$, $LaNiO_3$, $LaCoO_3$, $LaCrO_3$, and the like. Preferred dopants are strontium, calcium, cobalt, nickel, iron, tin, barium, cerium, and the like.

A layer of dense, gas-tight solid electrolyte 18 surrounds most of the outer periphery of the air electrode 16. The electrolyte comprises, for example, yttria stabilized zirconia about 1 micron to about 100 microns thick (0.001 millimeter to 0.1 millimeter). The electrolyte can be deposited onto the air electrode by well known, high temperature, electrochemical vapor deposition techniques. In the case where the electrolyte is to be deposited before the interconnection material, a selected radial segment or portion 24 of the air electrode 16 is masked during electrolyte deposition to make the electrolyte discontinuous for inclusion of a layer of non-porous, gas-tight, electrically conductive interconnection material 26 which is deposited on this segment or portion 24. If the interconnection material is to be deposited first, then the electrolyte portion of the air electrode is masked initially.

The dense interconnection material 26, which preferably extends the active axial length of each elongated cell 10 as shown, must be electrically conductive in both an oxidant environment and a fuel environment. The term "electrically conductive" as used herein means conducting electrons but not substantially conducting ions. The gas-tight interconnection 26 can be roughly similar in thickness to the electrolyte, approximately 30 microns to about 100 microns (0.03 millimeter to 0.1 millimeter) thick. The interconnection should be non-porous, namely over about 95% dense and preferably 99% dense. The interconnection material is highly electrically conductive at temperatures of about 1000° C., the usual operating temperature of a fuel cell. The interconnection is preferably dense enough to be substantially leak proof and advantageously has a coefficient of thermal expansion close to that of the solid electrolyte and the electrode onto which it is deposited, and the other components, including the support tube, if used. A preferred interconnection material is doped lanthanum chromite ($LaCrO_3$).

A fuel electrode or anode 20 substantially surrounds the solid electrolyte 18. The fuel electrode or anode 20 is porous, and can comprise, for example, nickel- or cobalt-zirconia cermet. As shown, the fuel electrode 20 also is discontinuous, being spaced from the interconnection 26 by a distance sufficient to avoid direct electrical communication between the fuel electrode 20 and both the interconnection 26 and the air electrode 16. The fuel electrode is approximately 100 microns (0.1 millimeter) thick. The fuel electrode can be deposited on the electrolyte, for example, by electrochemical vapor deposition techniques, where nickel particles are anchored to the electrolyte surface by a vapor deposited skeleton of electrolyte material.

Usually, an electrically conductive top layer 28 is deposited over the interconnection layer 26. This top layer is preferably comprised of the same material as the fuel electrode, namely nickel-zirconia cermet or cobalt-zirconia cermet, and is about the same thickness, approximately 100 microns (0.1 millimeter).

The foregoing elements form an electrochemical cell. The interconnection serves as an electrical interconnection to an electrode of a second electrochemical cell. The electrical connection is made along the axial length of the interconnect through a metal fiber felt (shown in FIG. 2). Each fuel cell is preferably tubular and typically is electrically connected in series with an adjacent fuel cell, although various serial and parallel arrangements are possible. A typical single cell generates an open circuit (unloaded) voltage of about one volt. The electrical power that can be supplied is a function of the dimensions of the cell, the supply of fuel and oxidant, and other factors. Multiple cells can be connected in series and/or parallel to achieve desired levels of voltage and current output from the electrochemical generator as a whole.

Figure 2:
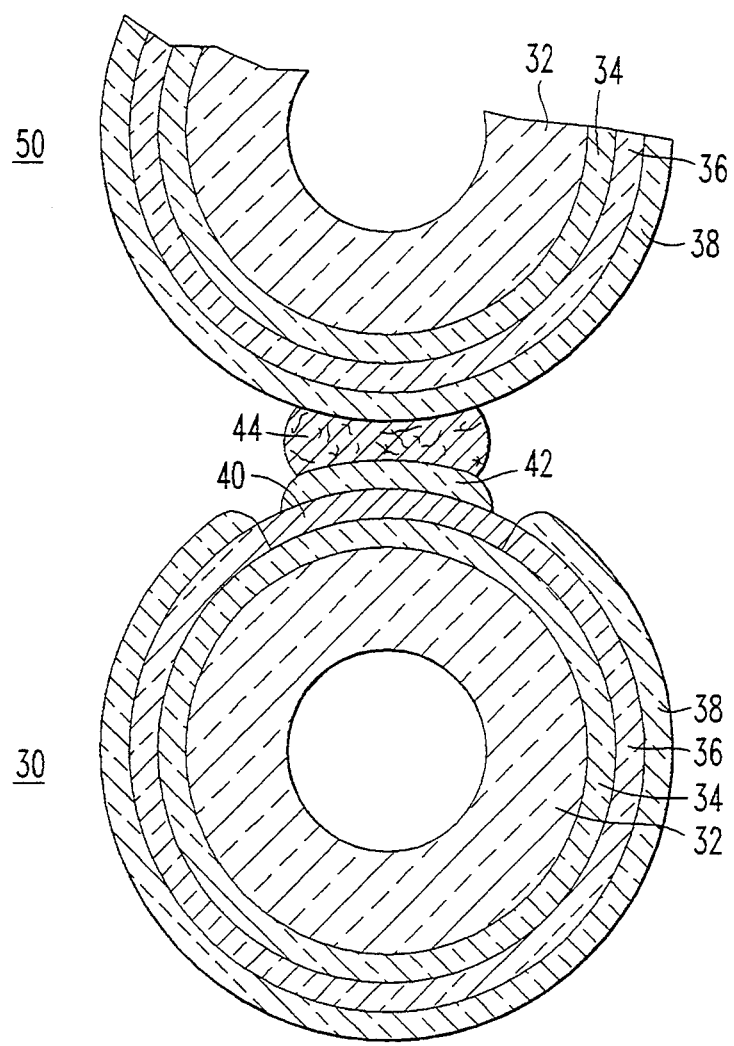
FIG. 2 is a schematic sectional view of two adjacent electrochemical cells, electrically connected by the interconnection layer formed according to the invention.

Referring to FIG. 2, an electrochemical cell 30 is electrically connected in series to an adjacent electrochemical cell 50 along an interconnection as shown. The first electrochemical cell 30 includes a porous support tube 32 and a porous, tubular, inner air electrode 34 generally surrounding the porous support tube. Generally surrounding the air electrode 34 is a solid electrolyte 36. Substantially surrounding the electrolyte is an outer fuel electrode 38. A selected radial segment of the air electrode is discontinuous and contains a non-porous, gas-tight, electrically conductive interconnect 40 along the discontinuity. As shown in FIG. 2, the fuel electrode 38 is also discontinuous, being spaced from the interconnection 40 a distance sufficient to avoid direct electrical communication between the fuel electrode 38 and both the interconnection 40 and air electrode 34. An electrically conductive layer 42, which is preferably made of the same material as the fuel electrode 38, is deposited over the interconnection 40.

In the example shown, a second electrochemical cell 30 is connected in series with the first electrochemical cell 50 via the electrically conductive interconnection 40, preferably extending the axial length of the fuel cell. The electrical interconnection preferably is enhanced by an optional metal fiber felt 44, for example, made of nickel fibers. The felt extends axially between the annular cells 30 and 50. In an inverted cell structure (where fuel flows inside the cells and the electrodes are reversed), the felt material is made from conducting oxide fibers, such as doped $In_2O_3$ or the like.

During operation of the depicted cells, air or $O_2$ flows through the center of the cells, and fuel passes over the exterior. Oxygen molecules diffuse through the optional porous support and air electrode or cathode. Fuel diffuses through the fuel electrode or anode. Oxygen ions pass through the electrolyte. These reactants interact via the actions of the electrolyte and electrodes, producing products such as water vapor and carbon dioxide, as well as generating heat and electrical energy. The high temperature water vapor and carbon dioxide are carried away, for example together with unburned fuel. Current is transferred by passing in part through the inner cathode 34 of one cell, through the electrically conductive interconnect 40, and metal felt 44, to the outer anode 38 of the second cell, and ultimately through the load via leads (not shown). A highly conductive interconnect is very important. Electrical resistances in the cells and their interconnections limit the potential efficiency of the electrochemical generator due to the dissipation of electrical energy in the resistive heating of such resistances.

Undoped lanthanum chromite is not very useful as an electrical interconnection, due to adverse characteristics including marginal conductivity and mismatched thermal expansion properties as compared to the rest of the fuel cell components. Doped lanthanum chromite, however, has excellent properties as an electrical conductor. Doping can increase the electrical conductivity as well as the coefficient of thermal expansion of lanthanum chromite, to obtain a better expansion match with the rest of the fuel cell components. Presently used lanthanum chromite interconnections are produced by electrochemical vapor deposition (EVD) or sintering at relatively high temperatures.

Preferred interconnection materials are non-porous and have a resistivity of less than 50 ohm-cm at 1000° C., a typical operating temperature of the fuel cell, making them highly electrically conductive. Other advantageous properties include moderate material cost and nearly unvarying composition when exposed to either fuel or oxidant atmospheres. The interconnection material should be non-reactive with other cell components at 1000° C., have negligible metal ion conduction, be free of destructive phase transformations in the region from 25° C. to 1200° C., have low volatility of oxide components in the working atmosphere, and be subject to fabrication as a thin layer impervious to oxygen gas and have low ionic conductivity when exposed to a fuel atmosphere at 1200° C. The interconnection material should further have a coefficient of thermal expansion as close as possible to that of the solid electrolyte and the electrode on which it is deposited, and the other components, including the optional support tube, to provide good longevity over cycles of temperature variation.

The interconnection material of the invention has surprisingly been found to be suitable in all these categories. The interconnection material comprises a thermally or plasma sprayed, preferably plasma arc sprayed, mixture of lanthanum chromite (LaCrO$_3$) particles, preferably undoped particles, and a liquid phase former particles, or, in other words, flux particles, preferably calcium aluminate ((CaO)$_{12}$·(Al$_2$O$_3$)$_7$) having the dopant e.g., Ca, Al, or the like, incorporated in the flux particles, which forms a substantially dense, highly doped, electrically conductive interconnection layer deposited onto an electrode surface, and which is further heated in a suitable atmosphere, such as air, at from about 1200° C. to 1350° C., to further enhance, i.e., densify and heal cracks of the plasma sprayed interconnection layer. This method of forming an interconnection layer of the invention provides a highly doped, dense, substantially gas-tight, stable, interconnection material or structure, suitable for use as an electrical connection between adjacent electrochemical cells.

Dopants can also be incorporated in the LaCrO$_3$ interconnection particles prior to thermal spraying (e.g., doped LaCrO$_3$ particles having the general formula La$_{1-x}$M$_x$Cr$_{1-y}$N$_y$O$_3$, where M is a dopant selected from the group of Ca, Sr, Ba and mixtures thereof, and N is a dopant selected from the group of Mg, Co, Ni, Al, and mixtures thereof, and where x and y are each independently about 0.075–0.25). Doped LaCrO$_3$ interconnection particles are less desirable since, if doped, the amount of advantageous flux particles integrally including dopant in the plasma spray mixture is reduced proportionally, which, accordingly, may affect the density of the sprayed interconnection material, e.g., less dense. Preferred dopants are Ca, Sr, Ba, Mg, Co, Ni, and Al, or mixtures thereof and the like.

Plasma arc sprayed or, generally, thermally sprayed doped lanthanum chromite interconnection layers deposited on the surface of an electrode, for example, an air electrode, have been found to remain porous and also to have regional cracked along the microstructure after cell processing. Such porosity leads to undesirable intermixing of the fuel and the oxidant during electrochemical cell operation. Intermixing of fuel and oxidant not only reduces the efficiency of the electrochemical generator due to localized burning of the fuel (as opposed to generation of electrical power), but also degrades the cell components, such as the interconnection, air and fuel electrode, reducing the life expectancy and reliability of the cells and the generator.

Thus, for prolonged cell life and stable cell component structures, leak proof interconnection layers are desirable. It has been found according to the invention that the density and gas-tightness of thermally sprayed interconnection layers, e.g. plasma arc sprayed, can be substantially enhanced by incorporating liquid phase former particles or flux particles in the plasma spray feed powder including the interconnection particles, as described in detail below. Preferably, the flux particles comprise the dopant and the interconnection particles are undoped in the spray feed powder. Thus, plasma spraying techniques using a densifying flux, provides a gas-tight, as well as highly doped, electrically conductive interconnection material, which upon subsequent heat treating to heal any cracks developed during plasma spraying, can be operatively positioned in an electrochemical fuel cell. The invention further provides distinct advantages over electrochemical vapor deposition or sintering techniques.

The term "flux" or "liquid phase former" used herein means a particle having the ability to develop into a liquid phase under heat by the melting of low-fusion components or, in other words, a sintering aid. Techniques to hot spray metal or metal oxide containing powders are encompassed by the terms "thermal spraying" or "plasma spraying" as used interchangeably herein.

In the method of the invention, while not wishing to be bound by theory, it is believed that the advantageous results are obtained because the flux particles comprising dopant upon thermal spraying form a transient liquid phase which diffuses into the interconnection material bulk lattice, such as the lattice of a doped oxide of the perovskite structure ABO$_3$, e.g. doped LaCrO$_3$, and interact with the bulk crystal in a manner which provides a highly doped, interconnection material, as well as a dense, substantially gas-tight and homogeneous crystal lattice. It is also believed that subsequent heat treatment further densities the interconnection material, and also heals the micro-cracks and macro-cracks in the interconnection layer characteristically resulting from thermal spraying techniques.

In addition, the interconnection particles, e.g., LaCrO$_3$, can also be enhanced prior to thermal spraying with increased (compensated) amounts of volatile constituents, e.g. chromium, as Cr$_2$O$_3$, which is typically volatilized during thermal spraying, and further the chromium can be compensated enough to provide a two phase interconnection material after the flux added thermal spraying of doped LaCrO$_3$+Cr$_2$O$_3$. The final doped LaCrO$_3$ interconnection layer can be either a single phase or a mixture of phases, preferably having the general formula La$_{1-x}$M$_x$Cr$_{1-y}$N$_y$O$_3$ or La$_{1-x}$M$_x$Cr$_{1-y}$N$_y$O$_3$+Cr$_2$O$_3$, where M is a dopant selected from the group of Ca, Sr, Ba, and mixtures thereof, N is a dopant selected from the group of Mg, Co, Ni, Al, and mixtures thereof and where x and y are each independently about 0.075–0.25. The thermal spraying and densification technique of spraying flux added LaCrO$_3$ particles followed by heat treatment densification according to the method of the invention provides a substantially gas-tight as well as highly doped, stable, electrically conductive interconnection material, and further provides distinct advantages over electrochemical vapor deposition techniques, sintering techniques, and also over conventional porosity forming plasma arc spraying techniques.

In the method of the invention, a thermal spray feed powder comprising a mixture of LaCrO$_3$ interconnection particles and flux particles are made or obtained. Typically the LaCrO$_3$ particles are made by well known techniques such as solid-state reaction or solution derived techniques. The solution derived techniques are taught, for example, in U.S. Pat. No. 3,330,697 (Pechini), which is hereby incorporated by reference. Generally, doped oxides of the perovskite structure ABO$_3$, e.g. LaCrO$_3$, are preferred for use as the interconnection material. It is preferred to obtain the LaCrO$_3$ particles in undoped form prior to thermal spraying, since a finite amount of dopant present in the bulk lattice of the LaCrO$_3$ proportionally reduces the amount of liquid phase former or flux added particles which can be used in the method. Doped LaCrO$_3$ particles accordingly are less preferred. Dopants which can be used, however, are at least one of Ca, Sr, Ba, Mg, Co, Ni and Al, and mixtures thereof, or the like.

The LaCrO$_3$ particles, preferably undoped prior to thermal spraying, are admixed with flux particles. The flux particles which form a transient liquid phase upon thermal spraying are preferably calcium aluminates, having the general formula $CaAl_2O_4$ or $CaO.Al_2O_3$, e.g. $(CaO)_{12}.(Al_2O_3)_7$, which has a melting point at about 1600° C. Calcium silicates can also be used. Also other flux particles which can be used are calcium chromates, e.g., $CaCrO_4$ or $CaCrO_4.2H_2O$, although less preferred, since they result in a less stable interconnection material at cell operating temperatures, typically at about 1000° C.

Typically, the flux particles are made by well known techniques such as solution derived techniques as taught in Pechini, previously incorporated by reference. It is desirable that the flux particles comprise a dopant material as an integral component of the flux particles, e.g., Ca, Sr, Ba, Mg, Co, Ni, Al, and the like or mixtures thereof. It has surprisingly been found that by combining the flux particles with the $LaCrO_3$ interconnection particles to provide a thermal spray feed powder prior to thermal spraying, provides, upon thermal spraying, a deposited interconnection material on an electrode structure of a electrochemical cell that is substantially gas-tight, i.e., substantially densified. This method tends to avoid the formation of pores within the interconnection material which is undesirable but has been found to be characteristic of thermal spraying unfluxed doped $LaCrO_3$ particles.

In the method of the invention, the flux added $LaCrO_3$ particle spray powder mix or plasma spray feed powder is preferably agglomerated prior to thermal spraying by well known agglomeration techniques to provide a freely flowing plasma spray feed powder. A preferred method of making an agglomerated plasma spray feed powder comprising the flux and interconnection particles is by spray drying techniques. A more detailed description of spray drying is described in Keith Masters, *Spray Drying Handbook*, Halsted Press Div., John Wiley and Sons, New York, N.Y. (1985), which is hereby incorporated by reference. The flux added mixture is agglomerated, preferably by spray drying techniques, to provide plasma spray flux added $LaCrO_3$ feed powder having large agglomerate sizes, spherical shapes, and narrow particle size distributions, and also free flowing. A freely flowing plasma spray feed powder facilitates plasma spraying. Prior to spray drying, the ratio (by weight) of flux particles to undoped $LaCrO_3$ particles is preferably in the range of 1:7 to 1:28, more preferably 1:14. In addition, to compensate for chromium loss and to a lesser extent dopant loss during plasma spraying, $Cr_2O_3$ or dopant, can also be added to the slurry before spray drying.

It is preferred that the plasma spray feed powder have a uniform particle size distribution with an average particle size range of about 5–80 microns in diameter, preferably 5–60 microns in diameter, even more preferably 10–44 microns in diameter. A narrow and fine average particle size range of 10–44 microns in diameter is preferred for precision injection, higher melting, lower differential volatilization of the interconnection constituents, e.g. chromium or dopant, and more uniform splat formation. A coarser average particle size range (−200 to +400 U.S. screen mesh), about 36–52 microns in diameter, can also be used, although finer particles are generally preferred. Other agglomeration techniques which can be used to make freely flowing flux added $LaCrO_3$ particles include, for example, sintering at substantial pressures and temperatures of over 1700° C. Care must be taken to maintain the desired La:Cr and La:Dopant, e.g. Ca, ratios in the agglomerated powder.

The flux added $LaCrO_3$ particles are, therefore, preferably provided in agglomerated form to facilitate entrainment in a plasma plume generated by a plasma spray gun. The physical properties of the agglomerated powders are important because they affect mass flow rate in feeding the plasma plume. Advantageous consequences of more uniform powder flow include a more homogeneous microstructure and better coating thickness control. The agglomeration techniques to provide larger agglomerate sizes, more spherical agglomerates, lower frequency of broken agglomerates, and a narrow or monodisperse particle size distribution provide for optimal flow and deposition parameters.

In the method of the invention, the flux added $LaCrO_3$ particles, preferably $(CaO)_{12}.(Al_2O_3)_7$ added $LaCrO_3$ particles, even more preferably $Cr_2O_3$ compensated $(CaO)_{12}.(Al_2O_3)_7$ added $LaCrO_3$ particles, in agglomerated powder form, are next thermally sprayed, such as by plasma arc spraying or flame spraying, onto portions of the surface of an electrode structure, e.g. selected portions of an air electrode of an electrochemical cell. More detailed description of thermal spraying techniques, such as, for example, plasma arc spraying and flame spraying techniques, are provided in U.S. Pat. Nos. 4,049,841 (Coker, et al.) and 5,085,742 (Dollard, et al.), which are hereby incorporated by reference. Plasma spray guns or devices used in plasma spraying are generally disclosed in U.S. Pat. Nos. 3,823,302 (Muehlberger) and 3,939,618 (Muehlberger), which are also hereby incorporated by reference.

Among the thermal spraying techniques, plasma arc spraying can be used. Plasma arc spraying generally comprises use of an electric arc discharge through which a gas is passed. As the gas passes the electric arc, it is ionized to obtain a plasma of ionized gas. The plasma is mixed with a powder metal or metal oxide, e.g., the flux added $ABO_3$ perovskite powder such as, for example, calcium aluminate and lanthanum chromite powder, which is suspended or entrained in a carrier gas. A plasma spray gun is used to discharge the plasma gas, whereby the entrained metal or metal oxide powder is directed to impinge upon a substrate whereupon a metal or metal oxide film is formed. The gases employed in plasma arc spraying are typically nitrogen, argon, hydrogen, helium or the like. The hydrogen, argon, or helium or the like is ionized as the plasma and the powder metal or metal oxide is suspended in the nitrogen, argon or the like carrier gas. Plasma arc spraying involves fusing a metal or metal oxide containing powder onto a surface. The arc temperature causes a molten-droplet of metal or metal oxide to impinge on a surface and solidify or freeze thereon.

Flame spraying can also be used. Flame spraying generally comprises spraying and fusing a powder metal or metal oxide onto a surface with a flame. Such flames are generated with a torch or similar apparatus, such as oxyacetylene torches, as disclosed, for example, in U.S. Pat. Nos. 2,786,779; 3,220,068; and, 3,238,060, the disclosures of which are hereby incorporated. Plasma arc spraying is preferred since it provides a higher temperature than flame spraying, and consequently results in a greater degree of bonding.

Thermal spraying techniques allow for the formation of highly doped electrically conductive interconnection material and provide distinct advantages over conventional electrochemical vaporization and sintering techniques. It has been found, on the one hand, that either plasma arc spraying or flame spraying an interconnection layer on an electrode surface using doped lanthanum chromite particles produce coating densities of typically only about 85 to 95% of theoretical density (i.e., about 5 to 15% porous) and are not sufficiently leak proof such that gas can pass through the structure, whereas prior electrochemical vapor deposition and sintering techniques provided closed pore structures. It has also been found that a plasma sprayed interconnection, which is not leak tight, operatively positioned in an electrochemical cell results in intermixing of fuel and oxidant during cell operation which is detrimental to electrical power generation and cell stability. However, on the other hand, plasma arc spraying or flame spraying techniques are desirable since they allow for inclusion of highly doped, electrically conductive interconnection layers, which provides a distinct advantage over conventional electrochemical vapor deposition and sintering techniques.

Thus, the inventors have focused on a method of providing an interconnection material on an electrode of an electrochemical cell using plasma spray deposition techniques, wherein the interconnection material is densified by a flux coextensively with deposition, thereby forming a dense and substantially closed pore structure material as well as a highly doped material to effectively function as an electrical interconnect between adjacent electrochemical cells. The inventors have surprisingly found that thermal spraying, preferably plasma arc spraying, using a flux added interconnection powder, provides not only a method of formation of a highly doped, electrically conductive interconnection material, which accordingly, provides distinct advantages over conventional electrochemical vapor deposition and sintering techniques, but also provides a method of formation of a substantially dense, i.e., substantially gas-tight, interconnection material upon a single plasma spraying step which avoids the porosity typically associated with known plasma spraying techniques. The density of the plasma sprayed interconnection after plasma spraying using the method of the invention is typically about 85 to 95% of theoretical density, preferably about 95 to 100% of theoretical density.

It has been found that a suitable high energy plasma spray can be generated employing an arc discharge having a voltage of about 30 to 60 volts and a current of about 400 to 900 amperes. The arc discharge is preferably about 20 to 40 kilowatts, most preferably about 22 kilowatts. Such a plasma spray can be generated by a variety of commercial devices, for example, a Miller Thermal Plasma Spray Gun, Model No. SG-100, having an anode, Model No. 2083-175. A preferred plasma spray gun includes a large bore nozzle. It further includes a perpendicular powder injection angle, as opposed to a backward injection angle, which produces the least amount of $Cr_2O_3$ and/or dopant differential volatilization over the particle size range. A backward injection angle can be used if the powder is sufficiently compensated with $Cr_2O_3$, and also with the dopant.

It is further preferred that the plasma gas comprises Ar primary gas, for example, about 8 to 40 slpm (standard liters per minute), and $H_2$ secondary gas, for example, about 0.15 to 2 slpm, when spraying in air. It is also preferred that the flux added $LaCrO_3$ powder feed rate is in the range of 2 to 40 grams per minute, preferably 6 to 20 grams per minute, even more preferably 10 to 15 grams per minute, with the use of vibratory feeders.

The powder carrier gas flow rate is preferably 1 to 10 slpm, more preferably 1 to 4 slpm. The plasma spray distance between the plasma gun nozzle and the substrate in air is preferably 3 inches or less, more preferably 2.5 inches or less. The spray distance to the substrate is preferably 1 to 2 mm of the selected spray distance.

It is also preferred that the plasma be directed perpendicular to the substrate. Low angle spraying of the molten droplets tends to produce porosity in the deposit and should be avoided. Since the metal oxide powder feed rate is high and the spray distance is close, the plasma spray gun is traversed along the selected radial segment of the electrode, for example, the air electrode of an electrochemical cell, at a constant velocity, preferably greater than 40 meters per minute (67 cm per sec.). Preferably the movement is incremental in order to deposit successive overlapping strips. It has also been found that a number of passes of the plasma spray gun over the selected portions of the electrode may be required to provide a uniformly thick coating.

The technique of thermal spraying, e.g., plasma arc spraying, the flux added interconnection powder, preferably calcium aluminate and lanthanum chromite powder, has been found to volatilize some of the constituents of the interconnection material, e.g. chromium or dopant, during thermal spraying. It is, therefore, desirable to increase or compensate the amounts of the volatile constituents proportionately in order to spray a coating that has a final bulk chemistry either equal to stoichiometric, $La_xM_{1-x}Cr_yN_{1-y}CrO_3$, where x and y are each independently about 0.075-0.25, or to any other desired chemistry and associated phases. Volatilization of the interconnection constituents e.g., $Cr_2O_3$ without providing compensation can result in localized hydration under humid conditions and cracking, which is undesirable. It is therefore, in some instances preferred to sufficiently compensate the plasma spray feed powder, preferably calcium aluminate flux and lanthanum chromite interconnection powder, with chromium as $Cr_2O_3$, to form an interconnection layer that is a mixture of two phases, e.g. doped $LaCrO_3 + Cr_2O_3$. The compensated amount of chromium is preferably in the range of about 0.2-0.4 moles for 1 mole of $LaCrO_3$. The dopant can similarly be compensated, although a slight decrease in dopant will not significantly affect the physical, chemical and electrical properties of the deposited interconnection layer. The compensated amount of dopant, preferably in the flux, is preferably in the range of 0.1-0.3 moles for one mole of $LaCrO_3$. The compensated $LaCrO_3$ powder can be similarly admixed with the compensated flux powder and agglomerated prior to spraying.

The technique of thermal spraying has also been found to deposit an interconnection layer that develops micro-cracks and macro-cracks within the surface coating. The flux added $LaCrO_3$ particle, deposited by being preferably plasma arc sprayed onto an electrode, may tend to crack even when applied to an electrode composition having similar thermal expansion properties. Because there is a steep temperature gradient between the freezing or solidifying deposit and the substrate during the cooling process, the deposit tends to shrink considerably more than the substrate during cooling. Most resulting tensile stresses are relieved by cracking and separation of the splats. Depending on the magnitude of the volume accommodation, large or macro-cracks can extend down from the surface of the deposit to the substrate surface.

In order to minimize crack formation, the interconnection deposit can be sprayed on a substrate that is heated, for example just to the freezing temperature of the molten sprayed powder. However, due to the unique ability of a chromium compensated powder composition to close coating cracks, acceptable gas barrier films can be plasma sprayed onto room temperature substrates. For example, the $La_xCa_{1-x}Cr_yAl_{1-y}O_3+Cr_2O_3$ rich phase compensated composition, independently 0.075–0.25, which results from the plasma spraying the chromium compensated calcium aluminate flux added $LaCrO_3$ powder has thermal expansion characteristics very similar to that of air electrodes, typically strontium or calcium doped lanthanum manganite.

Thermal spraying, especially plasma arc spraying, a fluxed added perovskite interconnection powder, preferably calcium aluminate flux added $LaCrO_3$ powder, not only provides high dopant concentrations e.g., Ca and Al, in the $LaCrO_3$ interconnection material, but also provides a homogeneous, substantially gas-tight (i.e., substantially non-porous) interconnection layer that does not suffer from the disadvantages, such as porosity, associated with conventional thermal spraying techniques. The thermally sprayed interconnection material using a flux added powder is advantageously leak proof in its operative position in the electrochemical fuel cell. It should preferably have greater than 95% of theoretical density, preferably greater than 99% of theoretical density. The high density to achieve gas-tightness at least results at a surface of the interconnection layer, preferably at the surface adjacent to a fuel electrode, even more preferably uniformly throughout the bulk lattice of the interconnection layer. It is also advantageous to further enhance the gas-tightness of this coating by healing the micro-cracks and macro-cracks which may have formed during thermal spraying.

In the method of the invention, after thermal spraying, the deposit is heated in air or a suitable atmosphere to further densify the interconnection by healing, i.e., closing, the micro-cracks and macro-cracks. The post spray heat treatment is preferably carried out at temperatures between about 1200° C.–1350° C., more preferably between about 1200° C.–1300° C. The flux added interconnection layer may also be further densified at these temperatures. While not wishing to be bound by theory it is believed that a residue of the flux present in the "grain boundaries" heals the micro-cracks and macro-cracks on heat treatment. The heat treatment can be a separate operation or can be integrated with the continued processing of the electrochemical cell. Surface conditioning, such as, by wet sanding or grit blasting can also be performed after plasma spraying and/or heat treatment. A surface smoothness of about 60 rms (route mean square) is preferred.

While further not wishing to be bound by theory, it is believed that the advantageous results of the method of the invention are obtained because the liquid phase former or flux liquifies upon plasma spraying and diffuses into and interacts with the bulk perovskite crystal lattice to form a homogeneous substituted crystal lattice structure which is highly doped and substantially densified, i.e., substantially nonporous throughout the bulk lattice. Moreover, the subsequent heat treatment, preferably in air, further liquifies the flux, which in turn, heals the micro-cracks and macro-cracks present in the plasma sprayed interconnection, making it further dense and substantially gas-tight. It is also believed that a small amount of the flux can exist in the "grain boundaries" of the interconnection. Thus, during plasma spraying, or during the subsequent heat treatment, the flux forms a liquid phase(s) which enhances the densification of the interconnection material.

The dense interconnection layer formed, via by plasma spraying a combination of flux particles and interconnection particles, and optionally chromium and/or dopant compensated particles, and subsequently heat treating, acts as a gaseous diffusion barrier, and accordingly, effectively prevents intermixing of fuel and oxidant during electrochemical cell operations. The void volume is the plasma sprayed interconnection layer is effectively reduced using the coincident densification process and plasma spraying deposition techniques. The final interconnection layer is substantially leak proof, preferably at least 95% of theoretical density, more preferably 99%.

In the method of the invention, a solid electrolyte layer preferably is applied over the remaining portion of the air electrode, if the electrolyte is to be applied after the interconnection, and a cermet fuel electrode is applied over the electrolyte. An optional cermet layer can be applied over the interconnection, to complete the formation of an electrochemical cell. This arrangement is especially advantageous for a high temperature, solid oxide electrolyte fuel cell, and is generally useful for various electrochemical cells with similar aspects. According to the fuel cell application, each cell is preferably tubular and connected at least in series to an adjacent fuel cell to form an electrochemical generator. The electrical connection is typically made along the axial length of the interconnection layer through a metal fiber felt as shown in FIG. 2. A typical cell generates an open circuit voltage of approximately one volt, and multiple cells can be connected in series and/or parallel to provide the desired system current and voltage. The invention is illustrated further with reference to the following practical example:

EXAMPLE 1

A high temperature, solid oxide electrolyte fuel cell tube was prepared. Initially a porous support tube of calcia stabilized zirconia was generally surrounded by a porous fuel electrode of doped lanthanum manganite using standard techniques. The air electrode was masked except for a selected radial segment along the axial length of the tube onto which an interconnection layer of flux added chromium compensated lanthanum chromite agglomerated plasma spray feed particles were thermally sprayed thereon by plasma arc spraying techniques.

The flux added interconnection plasma spray feed powder comprised a mixture of undoped $LaCrO_3$ interconnection particles +0.4 $Cr_2O_3$ compensation particles (base powder) and $(CaO)_{12}.(Al_2O_3)_7$ particles (flux powder) which was agglomerated by spray drying using a weight ratio of base powder:flux powder of about 14:1 dispersed into an aqueous slurry of diluted Darvan 821(A) (i.e., ammonium polyelectrolyte dispersing agent, R. T. Vanderbilt Co., Inc.) and PVA binder (polyvinyl alcohol) and using standard spray drying techniques.

The spray dried flux added chromium compensated feed powder was then plasma sprayed onto the selected portion of a lanthanum manganite, $La_{0.8}Ca_{0.2}MnO_3$, air electrode supported tubes (about 5 cm) using a plasma spray powder feed rate of about 10–15 grams/min., and a plasma gun power of about 22 kW.

Figure 3:
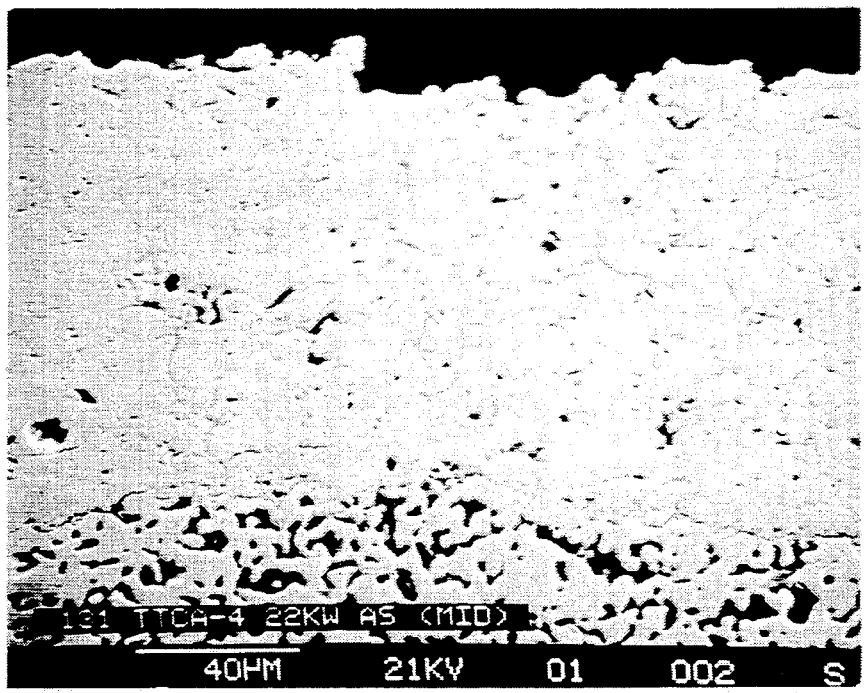
FIG. 3 is a scanning electron micrograph (SEM) of a plasma sprayed interconnection layer on an electrode structure using a flux added interconnection powder according to the method of the invention.

FIG. 3 shows the SEM of the flux added chromium compensated plasma sprayed interconnection material on the surface of the air electrode.

The gas-tightness of the interconnection was thereafter improved by heat treating the interconnection at about 1200°–1300° C. in air for 2 to 4 hours to further densify the interconnection and heal the cracks.

Figure 4:
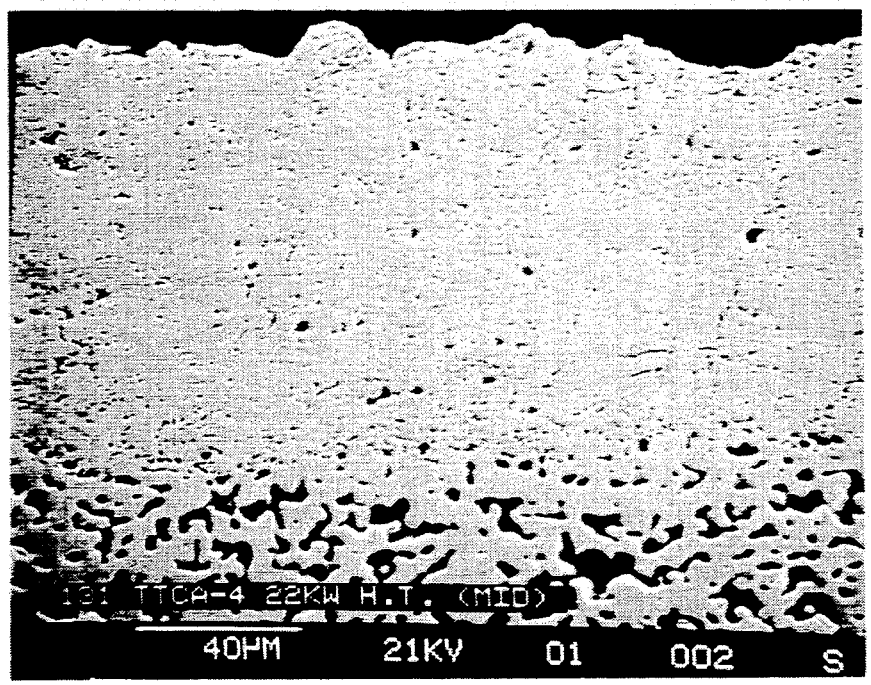
FIG. 4 is a scanning electron micrograph (SEM) of a plasma sprayed and heat treated interconnection layer on an electrode structure using a flux added interconnection powder according to the method of the invention.

FIG. 4 shows the SEM of the flux added chromium compensated plasma sprayed interconnection material after heat treatment.

The composition of the interconnection layer was approximately $La_{0.86}Ca_{0.14}Al_{0.16}Cr_{0.84}O_3 + 0.1-0.2 Cr_2O_3$.

The gas-tightness of the densified interconnection was measured by the vacuum leak rate method (i.e., pressure change (mmHg)/min over a fixed interconnection area of about $0.5 \times 3.8$ cm$^2$). The leak rate as a function of heat treatment is shown in the following table:

TABLE 1

Vacuum Leak Rages as a Function of Post Plasma Spraying Heat Treatment for $La_{0.8}Ca_{0.2}MnO_3$ Air Electrode Supported Tubes Plasma Sprayed with Flux Added Compensated Powder to form a $La_{0.86}Ca_{0.14}Al_{0.16}Cr_{0.84}O_3 + 0.1-0.2 Cr_2O_3$ Interconnection

| Leak Rate* Before Heat Treatment | Heat Treatment | Leak Rate* After Heat Treatment |
|---|---|---|
| 328 | 1200° C., 4 hrs | 0.4 |
| 319 | 1200° C., 6 hrs | 0.1 |
| 330 | 1300° C., 2 hrs | 0.0 |
| 329 | 1300° C., 4 hrs | 0.0 |
| 320 | 1300° C., 6 hrs | 0.0 |

*Average of 3 samples
Note:
Vacuum leak rate for a gas-tight interconnection is zero.

The interconnection layer was then masked using standard techniques, and an electrolyte of yttria stabilized zirconia was applied over the unmasked remaining portions of the air electrode using standard techniques. A fuel electrode of nickel zirconia cermet was applied over the electrolyte using standard techniques. The interconnection layer was also plated with nickel. The cell was then electrically tested at about 1000° C.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A method of forming a dense, substantially gas-tight, electrically conductive interconnection layer on an electrode structure, comprising the steps of:
   a. providing an electrode structure;
   b. providing a flux added thermal spray feed powder comprising a mixture of LaCrO$_3$ particles and flux particles, said mixture further including dopant selected from the group consisting of Ca, Sr, Ba, Mg, Co, Ni and Al;
   c. forming by thermal spraying the flux added feed powder, on a selected portion of the electrode structure, an electrically conductive interconnection material bonded to the electrode surface; and,
   d. heating the interconnection material in air at from about 1200° to 1350° C. to densify said interconnection material, to provide a dense, substantially gas-tight, electrically conductive interconnection material bonded to the electrode surface.

2. The method of claim 1, wherein the flux particles of the flux added feed powder of step b) comprises calcium aluminate powder including Ca and Al dopant.

3. The method of claim 1, wherein the flux particles of the flux added feed powder of step b) comprises calcium chromate powder including Ca dopant.

4. The method of claim 2, wherein the calcium aluminate flux particles to lanthanum chromite particles is provided in a weight ratio of about 1:7 to 1:28.

5. The method of claim 4, wherein the calcium aluminate flux particles to lanthanum chromite particles is provided in a weight ratio of about 1:14.

6. The method of claim 1, further comprising the step of:
   b.1. agglomerating the flux added feed powder prior to thermal spraying to form a freely flowing powder.

7. The method of claim 6, wherein agglomerating step b.1) comprises spray drying.

8. The method of claim 1, wherein the flux added feed powder of step b) is compensated with chromium oxide.

9. The method of claim 1, wherein the flux added feed powder of step b) is compensated with dopant.

10. The method of claim 1, wherein the electrode structure of step a) comprises an air electrode.

11. The method of claim 10, further comprising the steps of:
    e. applying a solid oxide electrolyte to the unselected portion of the electrode surface, and,
    f. applying a fuel electrode to the solid oxide electrolyte, to form an electrochemical cell.

12. The method of claim 11, wherein the air electrode is porous, doped LaMnO$_3$, the solid oxide electrolyte is substantially gas-tight, yttria stabilized zirconia, and the fuel electrode is porous, nickel-zirconia cermet.

13. The method of claim 1, wherein the electrode structure is generally tubular.

14. The method of claim 1, wherein the electrode structure is generally planar.

15. The method of claim 1, wherein the thermal spraying of step c) comprises plasma arc spraying.

16. The method of claim 1, wherein the heating step d) is between about 1200°–1350° C.

17. A dense, substantially gas-tight, electrically conductive interconnection layer produced according to claim 1.

18. A high temperature, solid oxide electrochemical cell, comprising:
    a first electrode;
    a solid oxide electrolyte disposed on a portion of the first electrode;
    a second electrode disposed on a portion of the solid electrolyte;
    an electrically conductive, substantially gas-tight interconnection material disposed on another portion of the first electrode for electrical coupling to an adjacent cell, said interconnection comprising a thermally sprayed flux added feed powder comprising a mixture of LaCrO$_3$ particles and flux particles, said mixture further including dopant selected from the group consisting of Ca, Sr, Ba, Mg, Co, Ni and Al, and heat treated at about 1200° to 1350° C.

19. The method of claim 1, wherein the LaCrO$_3$ particles of step b) are undoped.

20. The method of claim 1, wherein the LaCrO$_3$ particles of step b) are doped.

* * * * *